May 10, 1966 R. SCHEPT 3,250,134
CONTROL APPARATUS
Filed Dec. 12, 1962 2 Sheets-Sheet 1

INVENTOR.
ROBERT SCHEPT
BY
Roger W. Jensen
ATTORNEY

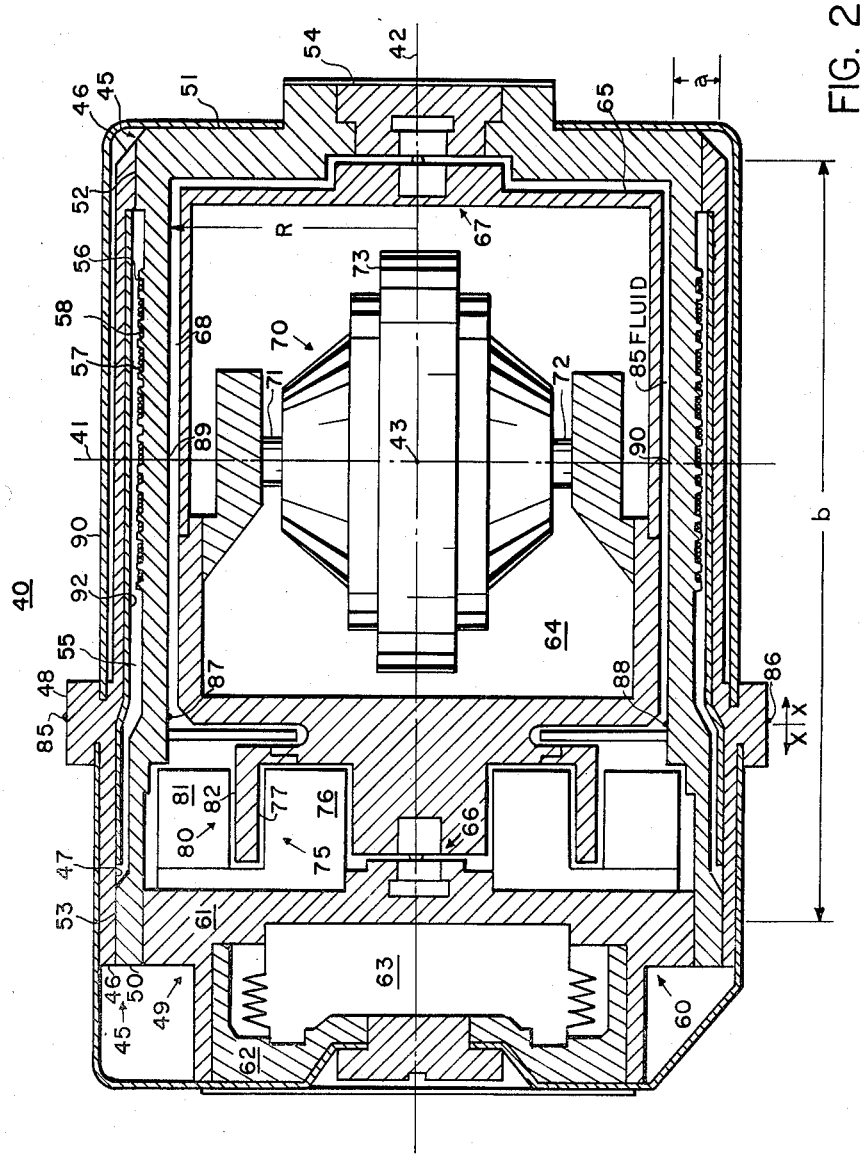

United States Patent Office 3,250,134
Patented May 10, 1966

3,250,134
CONTROL APPARATUS
Robert Schept, St. Louis Park, Minn., assignor to Honeywell Inc., a corporation of Delaware
Filed Dec. 12, 1962, Ser. No. 244,042
7 Claims. (Cl. 74—5)

This invention pertains to sensitive instruments and more particularly to floated sensitive instruments.

The applicant's invention has application to all floated, sensitive instruments, but it will be described with specific reference to a single degree of freedom, floated gyroscope. Present day single degree of freedom, floated gyroscopes contain a cylindrical gimbal element mounted for rotation about an output axis. It is necessary, in order to obtain the required gyro accuracy, that the gimbal mounting means be almost frictionless. The extremely low friction level is obtained through the utilization of pivot and jewel bearings in conjunction with a flotation fluid. The low friction level of the jewel and pivot bearings is further reduced by immersing the gimbal element in a fluid having a high density so as to render the gimbal element essentially "weightless."

However, this type of near frictionless mounting of the gimbal element has resulted in other problems. For example, the presence of perimetral or circumferential thermal gradients within the flotation fluid of a single degree of freedom, floated gyroscope results in fluid or drift torques acting upon the gimbal element about the output axis. These fluid torques result in erroneous output signals and reduced accuracy of the gyroscope. The fluid or drift torques acting upon the gimbal element about the output axis of the gyroscope are developed because the existence of a thermal gradient within the fluid results in a variation in local fluid density. Thus, in a gravity or force field, fluid motion occurs around the perimeter of the gimbal element as a more dense portion of the fluid moves in response to the gravity of the force field. Thus, it is clear that the fluid or drift torques are a function of the orientation of the gyroscope and the force field applied thereto in addition to the thermal gradient magnitude. Since the changing thermal gradients cannot be predicted the resultant fluid or drift torques cannot be compensated for and erroneous output signals are developed in the gyroscope.

Circumferential or perimetral thermal gradients in the fluid of a single degree of freedom, floated gyroscope are the result of both internal and external conditions. Internal conditions developing circumferential thermal gradients in the fluid surrounding the gimbal element comprise asymmetrical heat dissipation from the motor windings of the spin motor and the spin motor bearings (frictional heat). External conditions resulting in circumferential thermal gradients in the fluid surrounding the gimbal can be attributed to the non-uniformity of the environmental temperature field and the asymmetrical radiant heat exchange of the gyroscope with its surroundings.

It should be pointed out, that the temperature control system for a single degree of freedom, floated gyroscope only maintains an average fluid temperature. It does not prevent the occurrence of circumferential temperature gradients in the fluid of the gyroscope.

The applicant's invention increases the accuracy of a single degree of freedom, floated gyroscope by substantially reducing the fluid or drift torques developed due to circumferential thermal gradients in the fluid surrounding the gimbal element. To substantially reduce thermal gradients in the fluid it is necessary to provide means to dissipate internally generated heat and at the same time provide means for limiting the conduction of heat from the external environment to the fluid of the gyroscope. Thus, a very complex problem is presented.

The only prior art attempt to solve this problem has proven unsatisfactory. The prior art attempt was to merely insulate the gyroscope structure. This approach has several serious disadvantages. The first is that there are no known insulators with good mechanical stability which match the thermal coefficient of expansion of the metal case. Therefore, temperature cycling of the gyroscope results in case stresses and dimensional instability. Secondly, the high thermal impedance of this type of approach prevents the dissipation of internally generated heat and limits the ambient capability of the gyroscope, since the operating temperature thereof cannot be controlled in higher ambient temperatures.

The applicant has provided a solution to these problems by providing a unique thermal housing or casing for a gyroscope or sensitive instrument which substantially attenuates perimetral temperature gradients. The applicant's thermal casing provides a low thermal impedance heat conductive path for dissipating internally generated heat axially out the ends of the gyro. In addition, the effects of external temperature gradients are isolated from the fluid of the gyro by means of the unique geometric configuration of conductive low thermal impedance heat path provided in the thermal case. That is, the external temperature gradients are attenuated by the applicant's thermal case. Attenuation is defined as a ratio of perimetral temperature differences across a given geometry. Attenuation is a measure of independence from thermal gradient induced fluid or drift torques.

It is therefore an object of this invention to provide an improved sensitive instrument.

This and other objects of the invention will become apparent from a study of the accompanying specification and claims in conjunction with the drawings in which:

FIGURE 2 is a partial cross sectional view of the applicant's unique thermal case as applied to a floated gyroscope.

Figure 1:
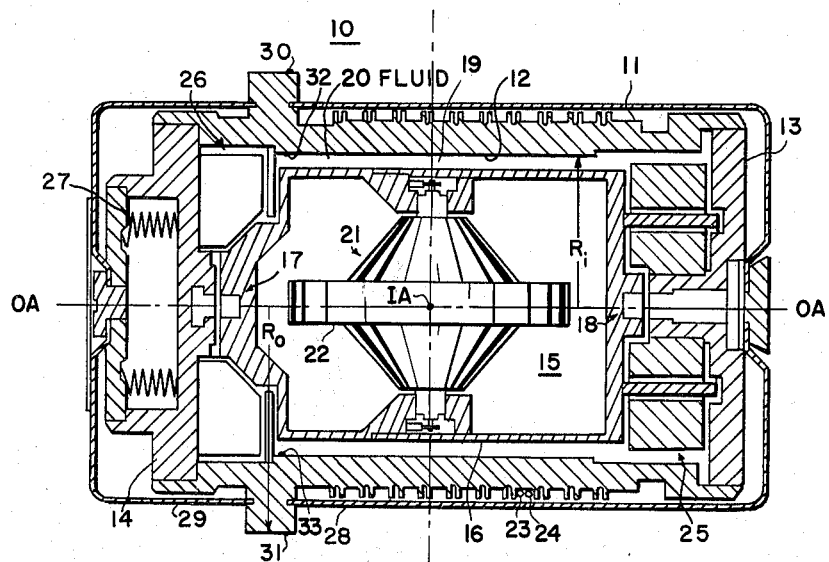
FIGURE 1 is a partial cross sectional view of a prior art gyroscope.

Referring now to FIGURE 1, reference numeral 10 general depicts a floated, single degree of freedom gyroscope. A generally cylindrically shaped casing or housing 11 is provided having a generally cylindrical opening 12 therethrough. The outer radius of the flange of casing 11 is identified by symbol $R_o$ and the radius of opening 12 is identified by symbol $R_1$. A disc shaped end member 13 closes one end of cylindrical opening 12 and a disc shaped end member 14 closes the other end of opening 12. Thus, casing or housing 11 and end members 13 and 14 define an enclosed cylindrical cavity 15.

A cylindrical gimbal element 16 is positioned within cavity 15 and rotatably mounted about an output axis OA by means of jewel and pivot bearing means 17 and 18. Output axis OA lies in the plane of the drawing (FIGURE 1). Gimbal element 16 is spaced apart from casing 11 and rotatable with respect thereto. The annular gap between housing 11 and gimbal element 16 is referred to as a damping gap and is identified by reference numeral 19. Fluid means 20 are positioned within cavity 15, completely filling damping gap 19 and surrounding gimbal element 16.

A spin motor 21 is positioned within gimbal element 16. Spin motor 21 includes a rotor element 22 which is rotatably mounted about a spin axis SA, by means of suitable bearings. Spin axis SA lies in the plane of the drawing (FIGURE 1) and is perpendicular to output axis OA. The input axis IA of gyroscope 10 is perpendicular to the plane of the drawing (FIGURE 1) and perpendicular to both output axis OA and spin axis SA.

A heater control winding 23 is positioned around the periphery of casing 11. A temperature sensitive winding 24 is also positioned around the periphery of casing 11. Winding 24 functions to control the energization of heater winding 23 so as to maintain gyro 10 at the proper operating temperature. The heater control winding only maintains fluid 20 at a constant average temperature, it does not prevent the occurrence of circumferential temperature gradients in fluid 20.

A torque generator 25 is positioned at one end of gyroscope 10 and a signal generator 26 is positioned at the opposite end. Torque generator 25 and signal generator 26 are well known to those skilled in the art and need not be described in detail. A bellows means 27 is also provided within cavity 15 to compensate for volumetric changes of fluid means 20 with temperature changes.

A dust cover 28 is positioned around one end of casing 11 so as to provide a seal therearound. A second dust cover 29 is provided around the other end of the casing element 11. Dust covers 28 and 29 are fabricated of a Mu metal so as to shield gyro 10 from external magnetic fields.

As stated earlier, thermal gradient attenuation is defined as a ratio of perimetral temperature differences across a given geometry. Relating this definition of attenuation to the structure illustrated in FIGURE 1, let $T_1$ indicate the temperature of the casing 11 at a point 30 on the outer diameter $R_o$ of casing 11. Let $T_2$ indicate the temperature of casing 11 at a point 31 on the outer radius, $R_o$ of casing 11 diametrically opposed to point 30. Let $T_3$ indicate the temperature of casing 11 at a point 32 on the inner radius $R_i$ thereof. Point 32 lies on a line defined by points 30 and 31. Let $T_4$ indicate the temperature of casing 11 at a point 33 on the inner radius $R_i$ thereof diametrically opposed to point 32. The thermal gradient attenuation A is defined by the formula:

$$A = \frac{T_1 - T_2}{T_3 - T_4}$$

Thus, attenuation is a measure of independence from thermal gradient induced fluid or drift torques. The higher the value of attenuation A, the lower the gyro drift due to fluid torques and the more accurate the gyro output signal.

The gyro casing 11 illustrated in FIGURE 1 is basically a thin walled cylinder. The casing 11 may be considered to be isotropic since it is fabricated from aluminum. Assume, for purposes of illustration, an imposed boundary temperature distributed according to a cosine funtion, that is, $T = T_0(1 + \cos \theta)$; where $\theta$ is the angle measured about axis OA and T and $T_0$ are temperatures. In this case, it can be shown that the attenuation of the prior art casing 11 is defined by the following formula:

$$A = \frac{\frac{R_o}{R_i} + \frac{R_i}{R_o}}{2}$$

Where $R_o$ equals the outer radius of the flange of casing 11 and $R_i$ equals the inner radius of casing 11. From this formula it is clear that for an isotropic material the attenuation is dependent only upon the geometry of the casing. In a typical single degree of freedom floated gyro, such as illustrated in FIGURE 1, $R_o$ equals one inch and $R_i$ equals .75 inch so that the casing has a thickness of .25 inch. It should be noted that these dimensions are approximately only. Substituting these values into the formula set forth above, the attenuation A equals 1.04. Since attenuation is defined as the ratio of the perimetral temperature differences across a given geometry, it is clear that the prior art type of gyro case has negligible atenuation. That is, temperature difference $T_1 - T_2$ on the outer periphery of gyro casing 11 is approximately equal to temperature difference $T_3 - T_4$ on the inner periphery of casing 11; fluid means 20 will be subjected to whatever external temperature difference exists on the outer periphery of casing 11.

Referring now to FIGURE 2, reference numeral 40 generally depicts a single degree of freedom, floated gyroscope utilizing the applicant's unique thermal casing. The spin axis 41 of gyro 40 lies in the plane of the drawing (FIGURE 2) and corresponds to the axis of rotation of a spin motor means. The output axis 42 of gyro 40 is perpendicular to spin axis 41 and lies in the same plane. The input axis 43 is perpendicular to both spin axis 41 and output axis 42 of gyro 40.

The applicant's unique thermal casing or housing is identified by reference numeral 45. Casing or housing 45 comprises a generally cylindrical outer shell 46 having a generally cylindrical bore 47 therethrough. Outer shell 46 has an enlarged radius section or flange 48 thereon positioned intermediate the ends thereof. Casing or housing means 45 also includes an inner shell 49 comprising a cup-shaped member 50 and an end wall means 60. The closed end of the cup-shaped member 50 is identified by reference numeral 51. End wall means 60 is positioned within cup-shaped member 50 opposite closed end 51. End wall means 60 comprises a generally disc-shaped member 61 rigidly attached to member 50 by suitable means (not shown) and a bellows mounting element 62 rigidly attached to member 61. A bellows assembly 63 is mounted upon mounting element 62 by suitable means (not shown). End wall means 60 and bellows assembly 63 thus close the open end of cup-shaped member 50. End portion 51 of member 50 functions to close the other end of cup-shaped member 50 in conjunction with a plug element 54. Thus inner shell 49 defines an enclosed, generally cylindrical chamber identified by reference numeral 64.

Outer shell 46 and inner shell 49 circumscribe output axis 42. Inner shell 49 has a smaller diameter than outer shell 46 and is positioned inside of outer shell 46 concentric therewith. Inner shell 49 is rigidly attached to outer shell 46 at each end thereof, as at points 52 and 53, by means of a close fit. However, care must be taken not to stress inner shell 49 or outer shell 46, at points 52 and 53, beyond the precise elastic limit so as to maintain dimensional stability. Inner shell 49 and outer shell 46 thus cooperate to define an annular gap 55 which extends axially over a substantial portion of the overall length of the gyro 40 along axis 42. Gap 55 functions to provide a high thermal impedance heat conductive path in a radial direction across casing 45. The outer surface of member 50 of inner shell 49 has a helical groove 56 thereon. Groove 56 functions to provide a means of locating heater control windings 57 and temperature sensitive winding 58 which are wrapped around the periphery of member 50. The function of windings 57 and 58 will be more fully described hereinafter.

A dust cover 90 is attached to flange 48 and encloses one end of casing 45 so as to provide a seal therearound. A dust cover 91 encloses the other end of casing 45 and is attached to flange 48. Dust covers 90 and 91 are fabricated from Mu metal so as to shield gyro 40 from external magnetic fields which react with the gyro components to produce "drift" torques and inaccuracies in the gyro output signal. A hollow, generally cylindrical Mu metal element 92 is positioned within annular gap 55 and rigidly attached to the inner surface of outer shell 46. Element 92 functions to further shield gyro 40 from external magnetic fields which, without element 92, could penetrate into gyro 40 through flange 48.

A hollow, generally cylindrical gimbal element 65 is positioned within chamber 64 and rotatably mounted by jewel and pivot bearing means 66 and 67. Gimbal element 65 circumscribes output axis 42 and is rotatable thereabout relative to the means defining chamber 64. Gimbal element 65 has a slightly smaller diameter than inner shell 49 so as to be radially spaced therefrom. The annular space between inner shell 49 and gimbal element 65 is identified as a damping gap 68. The function of damping gap 68 will be more fully discussed hereinafter.

A spin motor assembly 70 is mounted within hollow gimbal element 65 by means of bearings 71 and 72. Spin motor assembly 70 includes a rotor 73 which is rotatable about spin axis 41. Spin motor assembly 70 forms no part of the present invention and thus need not be described in detail.

A signal generator 75 is provided which is effective to produce a signal indicative of the rotation of gimbal element 65 about output axis 42 and indicative of the rotation applied to gyro 40 about input axis 43. Signal generator 75 comprises a laminated stator assembly 76, which is rigidly attached to end member 61 and a rotor 77. Rotor 77 is a cup-shaped assembly rigidly attached to gimbal element 65 and adapted to be rotated therewith. Signal generator means 75 forms no part of the applicant's invention and hence need not be described in any greater detail.

A torque generator 80 is provided which is effective to apply a torque to gimbal element 65. Torque generator 80 comprises a permanent magnet 81 rigidly attached to inner shell 49 and a moving coil 82. Moving coil 82 is mounted upon cup-shaped rotor element 77 which is attached to gimbal element 65. Torque generator 80 forms no part of the present invention and thus need not be described in any greater detail.

Fluid means 85 are positioned within and completely fills chamber 64. Gimbal element 65 is completely immersed in fluid means 85. Fluid means 85 has a density sufficient to support gimbal 65 and maintain it in a condition of neutral flotation. Thus, fluid means 85 functions to render gimbal element 65 essentially weightless and removes the load upon bearings 66 and 67 so as to provide a nearly friction-free mounting means. Fluid means 85 within damping gap 68 functions to provide viscous damping of the rotation of gimbal element 65.

It should be noted that the density of the fluid means 85 is temperature dependent and consequently fluid means 85 must be maintained at a relatively constant temperature so as to maintain the accuracy of gyroscope 40. This is achieved in gyro 40 by designing an operating temperature for the gyroscope which is higher than the highest ambient temperature to be encountered. This allows the addition of heat to the gyro by means of heater coils 57 to bring the gyro operating temperature up to the designated operating temperature regardless of the ambient temperatures. Most gyro applications call for operation in ambient temperatures up to 150° F.; consequently gyro 40 is designed to operate at a temperature of approximately 180° F. The operating temperature of gyro 40 is sensed by resistance winding 58 which is wound integral with heater windings 57. Resistance winding 58 is utilized as one leg of a bridge circuit, as in a conventional temperature control system, and the energization of the heater windings 57 is controlled thereby. The heater control windings 57 thus maintain the temperature of fluid means 85 at a constant *average* temperature to maintain substantially constant density for proper flotation of gimbal element 65 and substantially constant viscosity for proper damping of gimbal element 65.

However, it should be pointed out that heater control windings 57 only maintain an *average* fluid temperature. Heater control windings 57 do not prevent the occurrence of temperature gradients in fluid means 85. Circumferential temperature gradients in fluid means 85 surrounding gimbal element 65 result in fluid torques being applied to gimbal 65 about axis 42 as previously explained, and thus impairs the accuracy of gyro 40.

The applicant's unique thermal housing or casing 45 prevents or substantially reduces circumferential temperatures gradients in fluid means 85 and thereby substantially reduces the fluid torques acting upon the gimbal element 65 and provides a signfiicant increase in accuracy of gyroscope 40. It should be remembered, that circumferential temperature gradients in fluid means 85 may result from internal heat sources, such as the motor windings of spin motor 70 or from external heat sources, such as non-uniformity of the environmental temperature field. The most serious cause of circumferential temperature gradients in fluid means 85, is the external temperature field. The obvious solution to such a problem would be the utilization of insulation around the gyroscope housing. As is oftentimes experienced in the most logical solutions, utilization of insulation around the gyro housing results in serious drawbacks. One serious drawback is that there is no known insulator with good mechanical stability which matches the thermal coefficient of expansion of the metal gyro casing. Consequently, temperature cycling of the gyro will result in casing stresses and dimensional instability which cause alignment errors and consequently gyro inaccuracies. Another serious drawback is that merely insulating the gyro housing results in a high thermal impedance so that the internally generated heat cannot be adequately dissipated. This results in a high internal gyro temperature (without operation of the heater windings) so that the gyro operating temperature cannot be controlled in hot ambient temperatures. That is, the gyro cannot be utilized in high temperature environments.

The applicant however, has provided a unique thermal casing 45 which substantially reduces the perimetral or circumferential thermal gradients in fluid means 85 entirely by means of the geometry of the casing rather than by the use of insulation. In gyro 40, casing or housing 45 provides a low thermal impedance heat conduction path for dissipating internally generated heat axially out the ends of the gyro. In addition, the effects of external temperature gradients are isolated from the fluid of the gyro by means of the unique geometric configuration of the low thermal impedance heat conductive path provided in casing or housing 45. It will be noted that annular gap 55 provides a high thermal impedance heat path in a radial direction across casing 45, so that heat conduction will occur along the low thermal impedance heat conductive path. That is, the external temperature gradients are attenuated by the applicant's thermal case. Attenuation is defined as a ratio of perimetral temperature differences across a given geometry. Attenuation is a measure of independence from thermal gradient induced fluid or drift torques, and will now be related to the structure disclosed in FIGURE 2.

For purposes of illustration, assume the temperature is $T_1$ at a point 85 on the periphery of flange 48 of outer shell 46. Assume the temperature is $T_2$ at a point 86 diametrically opposed to point 85 on the periphery of flange 48 of shell 46. Assume the temperature is $T_3$ at a point 87 on the inner surface of inner shell 49. Assume the temperature is $T_4$ at a point 88 on the inner surface of inner shell 49 diametrically opposed to point 87. The thermal gradient attenuation obtained by the applicant's unique housing or casing 45 is then expressed by the following formula:

$$A = \frac{T_1 - T_2}{T_3 - T_4}$$

Relating this formula to the applicant's unique thermal casing or housing 45, it can be shown that for an isotropic casing the attenuation at any point along the casing X inches from the flange 48 is as follows:

$$A = \frac{\cosh \frac{P}{D}}{\cosh \left(\frac{2X - P}{D}\right)}$$

Where P equals the total length of the heat conductive path through outer shell 46 and inner shell 49; $P=2a+2b$ in FIGURE 2. D equals the diameter of chamber 64 that is, 2R in FIGURE 2. X equals the axial distance on the heat conducting path from the thermal gradient point of application (flange 48).

Thus, it is clear that the thermal gradient attenuation obtained by the applicant's unique thermal casing or housing 45 is a function of the total heat conducting path length and the diameter of chamber 64 in inner shell 49. With reference to the above formula, when X equals $P/2$, the denominator of the right hand term is equal to 1 and the attenuation is at a maximum. Thus, the point of maximum attenuation will occur where X is equidistant from flange 48, along the heat conducting path. In the gyro illustrated in FIG. 2, the point of maximum attenuation lies slightly to the right of a plane including axis 41 and axis 43. In practice, however, this point is designed to lie in a plane including spin axis 41 and input axis 43.

Figure 3:
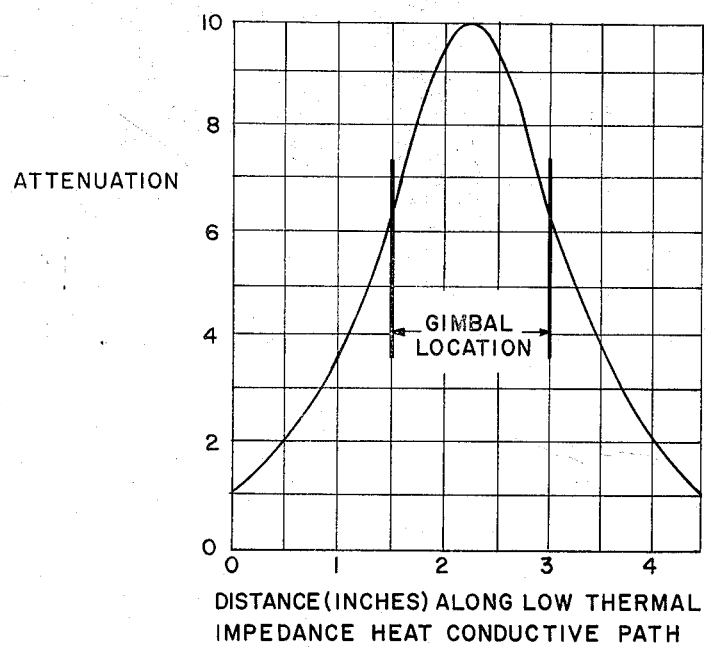
FIGURE 3 is a graph illustrating the thermal gradient attenuation obtained by the applicant's unique thermal casing or housing.

The desirability of this fact is more clearly understood with reference to FIGURE 3, which is a graph of the thermal gradient attenuation (ordinate) versus the distance from the thermal gradient point of application (mounting flange) along the heat conductive path (abscissa). The graph illustrated in FIGURE 3, is obtained by plotting the formula:

$$\frac{\cosh \frac{P}{D}}{\cosh \left(\frac{2X-P}{D}\right)}$$

and using characteristic dimensions for a single degree of freedom, floated gyro. The attenuation varies from a minimum of 1 at flange 48 to a maximum of 10.068 where $$X=\frac{P}{2}$$

or one-half the total heat conducting path. The gimbal location is superimposed on the graph illustrated in FIGURE 3 to illustrate the attenuation obtained at the inner shell adjacent to fluid means 85.

It should be pointed out that the existence of axial thermal gradients within fluid means 85 has a negligible effect upon the accurracy of gyro 40. Consequently, the fact that the attenuation varies axially along output axis 42 will not effect the accuracy of gyro 40. Casing or housing 45 is effective to provide a plurality of substantially isothermal bands or rings of fluid means 85 about output axis 42. Thus, perimetral thermal gradients are substantially eliminated in fluid means 85 by casing 45.

Circumferential temperature gradients existing at the flange in a normal prior art housing such as illustrated in FIGURE 1, result in drift torques sufficient to cause a drift torque rate change of approximately .2 degrees per hour per degree of gradient. The applicant's unique thermal casing or housing 45 is effective to reduce the drift rate of change to approximately .04 degree per hour per degree of gradient. This vast improvement in accuracy is obtained by maintaining the dimensional stability of the gyro and maintaining the ambient capabilities of the gyro. Thus, the applicant has provided a unique thermal casing which functions to provide increased gyro accuracy.

While the applicant's unique thermal casing has been described with reference to a single degree of freedom, floated gyroscope, it should be pointed out that the thermal casing has application to other floated instruments, for example, in a pendulous accelerometer. Also, it is not necessary to restrict the casing and the rotatable element to circular cross-sections, other geometric configurations may be utilized.

While I have shown and described a specific embodiment of this invention, further modification and improvements will occur to those skilled in the art. I desire it to be understood therefore, that this invention is not limited to the particular embodiment shown and I intend in the appended claims to cover all modifications which do not depart from the spirit or the scope of the invention.

I claim:
1. In a single degree of freedom floated gyroscope: casing means including an inner shell and an outer shell, said outer shell being concentric with said inner shell and circumscribing a first axis, said outer shell being in contact with said inner shell at each end thereof so as to define an annular gap therebetween, said inner shell defining a chamber symmetrical about said first axis; a gimbal element rotatably mounted within said chamber for rotation about said first axis relative to said inner shell; spin motor means mounted within said gimbal element for rotation about a second axis perpendicular to said first axis; fluid means filling said chamber, said gimbal element being immersed in said fluid means; signal generating means for indicating the rotation of said gimbal element about said first axis; and torque generating means for rebalancing rotation of said gimbal element about said first axis; said inner shell providing a low thermal impedance heat conductive path and effective to dissipate heat developed within said gyroscope so as to substantially reduce circumferential thermal gradients in said fluid means, said annular gap providing a high thermal impedance heat conductive path substantially perpendicular to said first axis so as to substantially eliminate radial heat flow across said casing means, said inner shell and said outer shell providing a low thermal impedance heat conductive path effective to attenuate circumferential thermal gradients in said outer shell of said gyroscope so as to substantially reduce circumferential thermal gradients in said fluid means.

2. In a floated gyroscope: casing means comprising an inner shell having a longitudinal axis and an outer shell, said outer shell being coaxial with said inner shell, said outer shell being in contact with said inner shell at each end thereof so as to define a gap therebetween; magnetic shielding means positioned within said gap; said inner shell defining a chamber; a gimbal element rotatably mounted within said chamber for rotation about said axis relative to said inner shell; spin motor means mounted within said gimbal element; fluid means filling said chamber, said gimbal element being immersed in said fluid means; signal generating means for indicating the rotation of said gimbal element about said axis; and torque generating means for rebalancing rotation of said gimbal element about said axis; said inner shell providing a low thermal impedance heat conductive path effective to dissipate heat developed within said gyroscope, said gap providing a high thermal impedance heat conductive path substantially perpendicular to said axis so as to substantially eliminate radial heat flow across said casing means, and said inner shell and said outer shell providing a low thermal impedance heat conductive path effective to attenuate perimetral thermal gradients in said outer shell, whereby said casing means is effective to substantially reduce perimetral thermal gradients in said fluid means.

3. In a floated inertial instrument: housing means including an inner shell and an outer shell, said outer shell being coaxial with said inner shell, said outer shell being in contact with said inner shell at each end thereof so as to define a gap therebetween, said inner shell having a chamber therein; fluid means filling said chamber; an element rotatably mounted within said chamber for rotation about the axis of said inner shell, said element being immersed in said fluid means; spin motor means mounted within said element, signal generating means; and torque generating means; said inner shell providing a low thermal impedance heat conductive path effective to dissipate heat developed within said instrument, said gap providing a high thermal impedance heat conductive path substantially perpendicular to said axis so as to substantially eliminate radial heat flow across said housing means, and said inner shell and said outer shell providing a low thermal impedance heat conductive path effective to attenuate perimetral thermal gradients in said outer shell of said instrument whereby said housing means substantially reduces perimetral thermal gradients in said fluid means.

4. In a floated sensitive instrument: casing means including an inner shell and an outer shell, said outer shell being coaxial with said inner shell, said outer shell being in contact with said inner shell at each end thereof so as to define a gap therebetween, said inner shell having a chamber therein; fluid means filling said chamber; an element rotatably mounted within said chamber for rotation about the axis of said inner shell, said element being immersed in said fluid means; said inner shell providing a low thermal impedance heat conductive path effective to dissipate heat developed within said instrument, said gap providing a high thermal impedance heat conductive path substantially perpendicular to said axis so as to substantially eliminate radial heat flow across said casing means, and said inner shell and said outer shell providing a low thermal impedance heat conductive path effective to attenuate perimetral thermal gradients in said outer shell whereby said casing means substantially reduces perimetral thermal gradients in said fluid means.

5. In a floated instrument: casing means including an inner shell and an outer shell, said outer shell being coaxial with said inner shell, said outer shell being in contact with said inner shell at each end thereof so as to define a gap therebetween, said inner shell having a chamber therein; fluid means filling said chamber; an element rotatably mounted within said chamber for rotation about the axis of said inner shell, said element being immersed in said fluid; said inner shell providing a low thermal impedance heat conductive path effective to dissipate heat developed within said instrument, said gap providing a high thermal impedance heat conductive path so as to substantially eliminate radial heat flow across said casing means, and said inner shell and said outer shell providing a low thermal impedance heat conductive path effective to attenuate perimetral thermal gradients in said outer shell whereby said casing means substantially reduces perimetral thermal gradients within said fluid means.

6. In an improved thermal housing for a floated gyroscope: an inner shell having a longitudinal axis; an outer shell, said outer shell being coaxial with said inner shell, said outer shell being in contact with said inner shell at each end thereof so as to define an annular gap therebetween; magnetic shielding means positioned within said gap, said inner shell having a chamber therein symmetrical about said axis adapted to be filled with fluid means, said inner shell providing a low thermal impedance heat conductive path effective to dissipate heat developed within said gyroscope, said annular gap providing a high thermal impedance heat conductive path substantially perpendicular to said axis so as to substantially eliminate radial heat flow across the thermal housing, and said inner shell and said outer shell providing a low thermal impedance heat conductive path effective to attenuate perimetral thermal gradients in said outer shell whereby said housing substantially reduces perimetral thermal gradients in said chamber.

7. In a thermal casing for a floated instrument: an inner shell; an outer shell, said outer shell being coaxial with said inner shell, said outer shell being in contact with said inner shell at each end thereof so as to define an annular gap therebetween, said inner shell including a chamber therein adapted to be filled with fluid means, said inner shell providing a low thermal impedance heat conductive path effective to dissipate heat developed within said instrument, said gap providing a high thermal impedance heat conductive path so as to substantially eliminate radial heat flow across the thermal housing, and said inner shell and said outer shell providing a low thermal impedance heat conductive path effective to attenuate perimetral thermal gradients in said outer shell whereby said casing substantially reduces perimetral thermal gradients in said chamber.

References Cited by the Examiner

UNITED STATES PATENTS

| | | | |
|---|---|---|---|
| 2,937,533 | 5/1960 | Barkalow | 74—5.4 X |
| 3,004,436 | 10/1961 | Katz | 74—5 |
| 3,031,892 | 5/1962 | Krupick | 74—5.5 |

MILTON KAUFMAN, *Primary Examiner.*

BROUGHTON G. DURHAM, *Examiner.*

T. W. SHEAR, *Assistant Examiner.*